( 12 ) United States Patent
Baral-Baron et al.

(10) Patent No.: US 10,101,456 B2
(45) Date of Patent: Oct. 16, 2018

(54) METHOD AND DEVICE FOR MEASURING THE SPEED OF AN AIRCRAFT BY DOPPLER

(71) Applicant: THALES, Neuilly-sur-Seine (FR)

(72) Inventors: Gregory Baral-Baron, Seyssins (FR);
Xavier Lacondemine, Alixan (FR);
Elisabeth Lahalle, Gif sur Yvette (FR);
Gilles Fleury, Paris (FR)

(73) Assignee: Thales, Courbevoie (FR)

( * ) Notice: Subject to any disclaimer, the term of this patent is extended or adjusted under 35 U.S.C. 154(b) by 1077 days.

(21) Appl. No.: 14/329,734

(22) Filed: Jul. 11, 2014

(65) Prior Publication Data

US 2015/0025835 A1   Jan. 22, 2015

(30) Foreign Application Priority Data

Jul. 17, 2013  (FR) ...................................... 13 01691

(51) Int. Cl.
*G01P 5/00* (2006.01)
*G01S 17/88* (2006.01)
(Continued)

(52) U.S. Cl.
CPC ................ *G01S 17/88* (2013.01); *G01P 3/36* (2013.01); *G01S 7/4861* (2013.01); *G01S 17/58* (2013.01)

(58) Field of Classification Search
None
See application file for complete search history.

(56) References Cited

U.S. PATENT DOCUMENTS 9,599,714 B2 *   3/2017   Imaki ...................... G01S 17/58
2011/0116074 A1   5/2011   Valla et al.
(Continued)

OTHER PUBLICATIONS

Nicolas Cezard; "Development of a Short-Range 355-nm Rayleigh-Mie Lidar Using Michelson Interferometer for Wind Speed Measurements;" SPIE; May 1, 2007; Bellingham, Washington US.

*Primary Examiner* — David M Gray
*Assistant Examiner* — Geoffrey T Evans
(74) *Attorney, Agent, or Firm* — Davis Wright Tremaine LLP; Michael J. Donohue

(57) ABSTRACT

The invention relates to the measurement of the speed of an aircraft by Doppler laser anemometry, the aircraft being equipped with a LiDAR using coherent detection. According to the invention, the measurement method comprises the following steps:
  emission by the lidar of a laser beam,
  reception by the lidar of a signal backscattered by particles present in the path of the beam emitted and generation of the corresponding heterodyne signal,
  processing of the heterodyne signal by the processor unit which comprises the following sub-steps:
    time-frequency analysis of the heterodyne signal,
    estimation of the speed of the aircraft based on the time-frequency analysis,
  wherein the step for processing the heterodyne signal comprises a statistical test sub-step with:
    estimation of a statistical function from the TFR of the heterodyne signal,
    estimation of a reference statistical function from the TFR of the noise associated with the heterodyne signal,
(Continued)

calculation of a difference between the statistical function from the TFR of the heterodyne signal and the reference statistical function from the TFR of the noise.

8 Claims, 5 Drawing Sheets

(51) Int. Cl.
  *G01P 3/36* (2006.01)
  *G01S 17/58* (2006.01)
  *G01S 7/486* (2006.01)

(56) References Cited

U.S. PATENT DOCUMENTS

2011/0181863 A1   7/2011   Renard et al.
2012/0206712 A1*  8/2012   Chang .................... G01S 17/87
                                                          356/28

\* cited by examiner

METHOD AND DEVICE FOR MEASURING THE SPEED OF AN AIRCRAFT BY DOPPLER

FIELD OF THE INVENTION

The field of the invention is that of the measurement of the speed of an aircraft by Doppler laser anemometry, the aircraft being equipped with a LiDAR using coherent detection.

BACKGROUND OF THE INVENTION

The principle of Doppler laser anemometry is to measure the frequency shift between the emitted laser beam and the beam backscattered by the particles (or aerosols) naturally present in the atmosphere, this frequency shift being directly proportional to the radial component (in other words along the laser line-of-sight) of the relative speed of the carrier with respect to the air. Hereinbelow, the speed along the laser line-of-sight is denoted more simply as the speed.

The method of measuring the speed of the aircraft conventionally comprises the following steps:
emission by the lidar of a laser beam,
reception by the lidar of the wave backscattered by particles present in the path of the emitted beam and generation, at the output of the photodetector, of the heterodyne signal resulting from the beat frequency between the backscattered wave and a fraction of the emitted wave, also referred to as local oscillator,
processing of the heterodyne signal by a processor unit installed onboard the aircraft in order to obtain the speed.

Under certain atmospheric conditions, notably at high altitude, the atmospheric backscattering coefficient may, owing to the rarefaction of the aerosols, turn out to be insufficiently high to produce a usable LiDAR signal. Indeed, because of the quantum nature of light, the heterodyne signal is affected by a measurement noise interchangeably referred to as Schottky noise or photon noise to which may be added other contributors such as the intensity noise of the laser, the dark noise of the photodetector or again thermal noise. Furthermore, despite the amplification provided by the process of coherent detection, the Signal-to-Noise ratio remains potentially problematic. The single-particle mode of operation is appropriate for these situations. It consists in concentrating the laser power within a very small volume (~0.1 mm$^3$) by using a highly focused beam. When the "target" particles pass through the beam close to its focal point, they then produce an individually detectable signal.

The existing processing methods, one example of which is illustrated in FIG. 1a, consist in individually detecting, in the heterodyne signal, the useful signals produced by the passage of the particles in the laser beam in order to estimate their central frequency. The useful signals are analyzed using a time-frequency representation (TFR), well adapted to non-stationary signals, one example of which is illustrated in FIG. 1b. A useful signal is detected if its amplitude on the time-frequency representation is greater than a detection threshold defined as a function of the targeted maximum probability of false alarm. Then, the central frequency of each detected signal is estimated. The Doppler frequency on a line of sight is then estimated using the central frequencies of the single-particle signals detected over a given period of time.

In order to estimate the Doppler frequency—and as a consequence the speed—with a sufficient precision, it is necessary to maintain a low probability of false alarms which makes it essential to adopt a sufficiently high detection threshold. In order to obtain, for example, a precision having a standard deviation $\sigma$ of around 0.2 MHz in Doppler frequency, which is equivalent to a precision having a standard deviation $\sigma$ of around 0.15 m/s in speed, for a wavelength of $\lambda$~1.5 µm, a threshold of around 12.5 to 13 dB above the mean level of the noise on the TFR must be adopted.

Such a processing method allows a satisfactory level of performance to be achieved in a large number of cases, but it does not offer a sufficient margin to guarantee the availability, the precision and the integrity of the measurement in any situation, as is required by the application areas such as aeronautics.

Consequently, there currently still remains a need for a method of measuring the speed of an aircraft that simultaneously gives satisfaction for all of the aforementioned demands, in terms of availability, of precision and of integrity, including in local and short-term situations of very low seeding of the atmosphere with particles.

BRIEF SUMMARY OF THE INVENTION

More precisely, the subject of the invention is a method for measuring the speed of an aircraft equipped with a lidar using coherent detection and with a unit for processing the detected signal, which comprises the following steps:
emission by the lidar of a laser beam,
reception by the lidar of a signal backscattered by particles present in the path of the emitted beam and generation of the corresponding heterodyne signal,
processing of the heterodyne signal by the processor unit which comprises the following sub-steps:
time-frequency analysis of the heterodyne signal, in order to obtain a time-frequency representation of this signal or TFR,
estimation of the speed of the aircraft based on the time-frequency analysis.

It is mainly characterized in that the step for processing the heterodyne signal comprises a statistical test sub-step with:
estimation of a statistical function from the amplitude of the TFR of the heterodyne signal, within a range of values corresponding to a given range of speeds of the aircraft,
a measurement noise being associated with the heterodyne signal, estimation of a reference statistical function from the TFR of this noise,
calculation of a difference between the statistical function from the TFR of the heterodyne signal and the reference statistical function from the TFR of the noise, the speed of the aircraft being furthermore estimated using this difference.

The method uses a statistical approach that does not require any a priori knowledge of the signals being sought but only the knowledge of the statistical function from the TFR of the noise. This function may be estimated in real-time based on a sample of noise alone.

This method allows the availability of the speed measurement to be improved in a situation of low concentration in the atmosphere of particles accessible to the LiDAR measurement, and can do this thanks to the exploitation of the signals with the lowest signal-to-noise ratio.

The implementation is not very costly in processing time and is perfectly compatible with a real-time application. The calculation of the distribution function is only a simple cumulation, of complexity O(N), whereas with a method such as described in the introduction, the calculation of the TFR has a higher complexity, O(N log$_2$(N)), and this calculation according to the prior art can already be implemented in real-time with the current programmable electronic components.

According to one feature of the invention, the statistical test furthermore comprises the selection of a frequency band based on the difference and on a predetermined threshold, with potentially a detection of useful signals in the TFR of the heterodyne signal, within this frequency band.

According to one feature of the invention, when useful signals have been detected in this band of frequencies, the statistical test furthermore comprises an estimation of the central frequency for each useful signal, the step for estimating the speed of the aircraft then being carried out using these central frequencies.

The calculation of the TFR can be obtained by time-frequency transformation, using for example a Short-Term Fourier Transform (STFT) or by time-scale transformation. A Gaussian window may, for example, be used for the STFT or a Morlet wavelet for the time-scale transform.

The statistical function is typically a distribution function or a distribution law.

The noise is preferably stationary over the time for estimation of the distribution function, associated with said range of speeds.

The calculated difference is for example a root mean square difference or calculated by a test of the $\chi^2$ or of the Kolmogorov-Smirnov type.

The laser is for example an infrared (IR) laser.

Another subject of the invention is a computer program product, said computer program comprising code instructions allowing the steps of the method such as described to be carried out, when said program is executed on a computer.

The invention also relates to a device for measuring the speed of an aircraft, which comprises, associated with a lidar using coherent detection, a unit for processing the detected signal comprising means of implementing the method such as described, where these means can be this computer program.

BRIEF DESCRIPTION OF THE DRAWINGS

Others features and advantages of the invention will become apparent upon reading the detailed description that follows, presented by way of non-limiting example and with reference to the appended drawings in which.

From one figure to another, the same elements are identified by the same references.

DETAILED DESCRIPTION OF THE INVENTION

The calculation allowing the amplitude of a signal to be obtained on the spectrogram is first of all recalled.

Figure 1A:
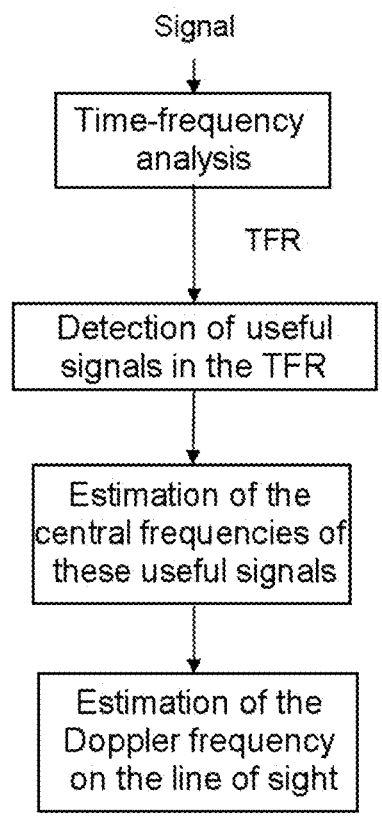
FIG. 1a, already described, presents a flow diagram showing steps of a method for measuring the speed of an aircraft according to the prior art, with, in FIG. 1b, one example of TFR obtained by STFT, also denoted spectrogram.
Figure 1B:
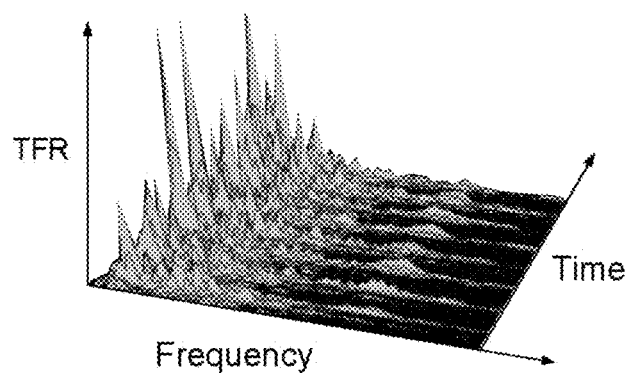
Figure 2:
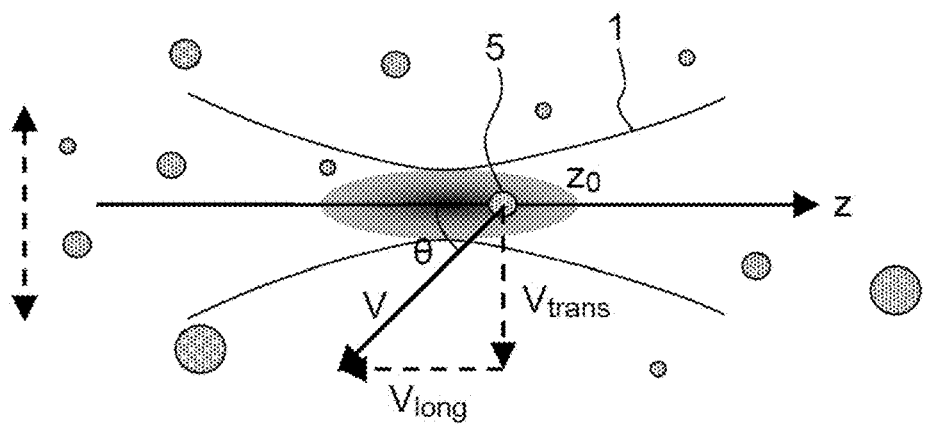
FIG. 2 illustrates schematically particles present around a laser beam.

A Gaussian laser beam 1 is considered, having a radius $\omega_0$ at the focal point and a wavelength $\lambda$. A spherical particle 5 of radius r is considered, having a speed V and intersecting the beam at a distance $z_0$ from the focal point as illustrated in FIG. 2. The backscattering cross-section $S_{\it{eff}}$ determines the portion of the emitted wave backscattered by the particle. This cross-section is a function of the size of the particle, of the medium and of the wavelength of the laser.

The speed of this particle may be decomposed into a radial component (in other words along the axis of propagation of the laser beam) and a transverse component (in other words in the plane orthogonal to the axis of propagation of the laser beam).

The electric signal resulting from the passage of the particle in the laser beam is a linear chirp with a Gaussian envelope, the simplified expression for which is given hereinbelow:

$$u(t) = s(t) + w(t)$$

$$s(t) = A_0 \exp\left(-\frac{8}{D^2}(t-t_0)^2\right) \cos\left(2\pi\left(f_0 t + \frac{Ve}{2}(t-t_0)^2\right) + \phi_0\right)$$

where:
D=f(V, $z_0$) is the duration of the signal
Ve=f(V, $z_0$) the speed of variation of the instantaneous frequency,
$f_0$=f(V) is the Doppler frequency of the signal,
$A_0$=f($S_{\it{eff}}$, $z_0$) is the amplitude of the signal,
$\Phi_0$ is a constant,
$t_0$ is the moment in time at which the particle intersects the z axis.
w(t) is a noise of spectral power density $\sigma_w^2$(f).
For the targeted application, the Signal-to-Noise Ratio (SNR) is defined according to:

$$RSB = \frac{A_0^2}{\int \sigma_w^2(f) df}$$

For particles of small size, SNR<1.

In order to improve the SNR, a time-frequency analysis is used in order to obtain a TFR, which can itself be obtained by a time-frequency transformation or by a time-scale transformation.

In the present example, a time-frequency transformation based on a decomposition by Short-Term Fourier transform (STFT) with a Gaussian time window is chosen; the spectrogram (square of the modulus of the Short-Term Fourier Transform) is therefore defined according to:

$$S(t, f) = |TFCT(t, f)|^2$$

with:

$$TFCT(t, f) = \int_{-\infty}^{+\infty} u(\tau)h(\tau - t)\exp(-2i\pi f\tau)d\tau$$

$$h(t) = \frac{1}{\sqrt{2\pi}\,\sigma_h}\exp\left(-\frac{t^2}{\sigma_h^2}\right)$$

$\sigma_h$ being a time width predetermined so as to fix the width of the Gaussian envelope of h(t).

The spectrogram S(t, f) of the signal s(t) is expressed as:

$$S(t, f) = CNR\exp\left(-\frac{A(t-t_0)^2 + B(f-f_0)^2 - C(t-t_0)(f-f_0)}{Y}\right)$$

with:

$$CNR = RSB \frac{\sqrt{\pi}}{2\sigma_h\sqrt{Y}}$$

$$A = \frac{1}{\sigma_h^2}\left(\frac{16}{D^2}\left(\frac{16}{D^2} + \frac{1}{\sigma_h^2}\right) + 4\pi^2 Ve^2\right)$$

$$B = 4\pi^2\left(\frac{16}{D^2} + \frac{1}{\sigma_h^2}\right)$$

$$C = \frac{8\pi^2 Ve}{\sigma_h^2}$$

$$Y = \left(\frac{16}{D^2} + \frac{1}{\sigma_h^2}\right)^2 + 4\pi^2 Ve^2$$

The maximum amplitude of the spectrogram of a signal is therefore equal to:

$$S(t_0, f_0) = CNR = RSB \frac{\sqrt{\pi}}{2\sigma_h\sqrt{\left(\frac{16}{D^2} + \frac{1}{\sigma_h^2}\right)^2 + 4\pi^2 Ve^2}}$$

The amplitude of the spectrogram of a signal is amplified by a factor:

$$\frac{\sqrt{\pi}}{2\sigma_h\sqrt{\left(\frac{16}{D^2} + \frac{1}{\sigma_h^2}\right)^2 + 4\pi^2 Ve^2}}$$

This factor is equal to around 15-20 dB for the useful signals coming from particles crossing the laser beam at a point close to the focal point. When the time signal is affected by a Gaussian noise, the spectrogram is affected by a noise with an exponential distribution, which leads to the choice of a detection threshold of 12.5-13 dB above the mean value of the spectrogram of the noise in such a manner as to obtain of the order of one to a few false alarms per period of observation of the signal, the expected number of particles detected over the same period of observation being at least a few tens; the spectrogram of the noise is obtained by the same time-frequency analysis (time-frequency or time-scale representation) as that used for the detected signal.

These digital values, together with those given by the following, are established by taking as example an aircraft in a situation (high altitude:

stratospheric background) with a low concentration in the atmosphere of particles accessible to the measurement of its LiDAR of wavelength λ~1.5 μm, and whose air speed is in the range between 0 and 300 m/s.

As indicated in the introduction, under certain atmospheric conditions, the particles encountered may be of very small sizes (background population in the stratosphere) or the environment may be modified (fall in the humidity level). In these cases, the backscattering cross-section of the particles will decrease, leading to a reduction in the amplitude of the spectrogram of the signals. The result can then be that no signal coming from a particle is detected for several tens of milliseconds.

Figure 3B:
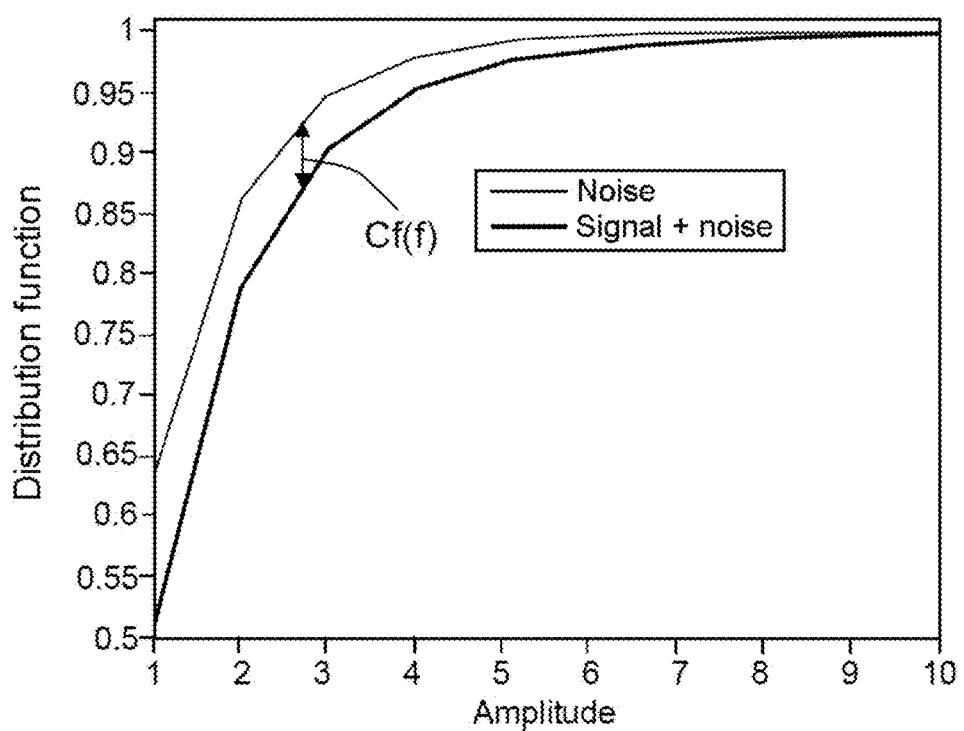
FIG. 3a presents a flow diagram showing steps of one example of a method for measuring the speed of an aircraft according to the invention, with, in FIG. 3b, one example of distribution functions from the TFR respectively coming from the detected signal and from the measurement noise.
Figure 3A:
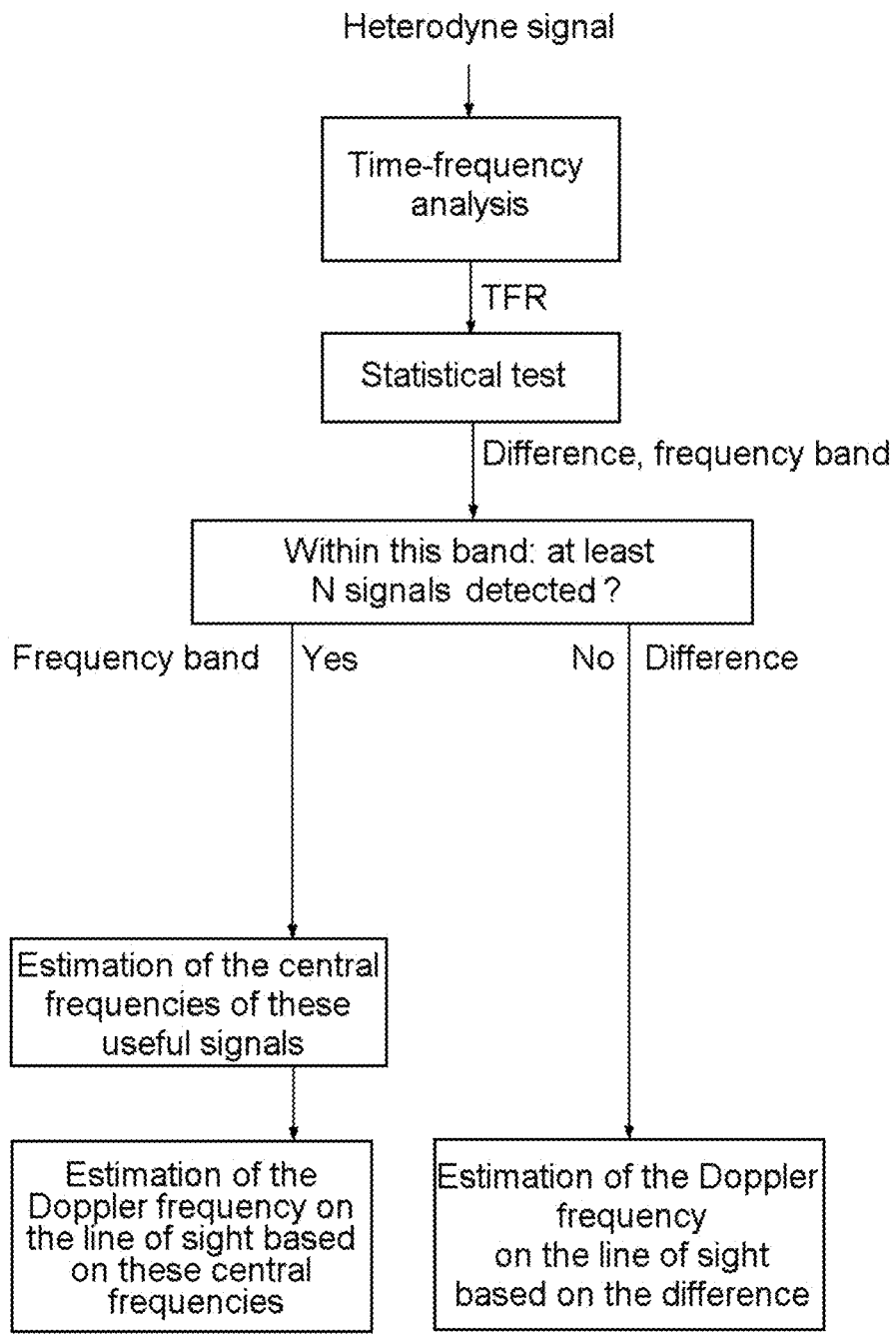

The invention described in relation to FIG. 3a is based on an estimation of a statistical function from the amplitude of the time-frequency (or time-scale) representation of the signal being analyzed, for each frequency (or for each scale); this statistical function is typically the distribution function or the distribution law. This function is compared with a reference statistical function (distribution function or distribution law) of the TFR of the noise as shown in FIG. 3b. The TFR used for the characterization of the noise is the same as that used for the signal being analyzed; the TFR of the measurement noise is for example determined by calculation or determined a priori. The objective is to determine whether the observations coming from the backscattered signal follow the statistical function coming from the noise or not. In the negative case, this means that the statistic coming from the noise has been modified by useful signals. This comparison, also denoted statistical test or suitability test, is carried out for each frequency of the TFR and a frequency band of the useful signals is defined which is composed of the frequencies at which there is no suitability between the observations and the distribution law coming from the noise.

In the following part, the distribution function is taken as one example of statistical function.

The calculation of the distribution function of the amplitude of the spectrogram $F_{obs}(f, x)$ is performed for:
  all the frequencies $f_j$, $f_1 \in [0, F_e/2]$, $F_e$ being the sampling frequency predetermined according to the maximum speed of the aircraft,
  all the moments in time $t_i$, $t_i \in [0, T_{obs}]$, where $T_{obs}$ is the period of observation predetermined in such a manner that the speed of the aircraft is stable over this period of observation; this will be a very large interval of time with respect to that of the sampling period,
  and $N_{obs}$ the number of observations during $T_{obs}$, over a range of amplitude $x_k$, $x_k \in [0, x_{max}]$, $x_{max}$ being predetermined and corresponding to the value from which the distribution function of the noise is virtually equal to 1. Since the useful signals are rare under certain conditions, the variations generated in the distribution function of the signal are small. In order to detect these variations, the variance of the estimator of the distribution function must be sufficiently small.

The estimation of the distribution function therefore requires a large number of observations $N_{obs}$ in order to reduce the uncertainty.

It is calculated in the following manner.
For i=0: $T_{obs}$
For j=0: $F_e/2$
For k=0: $x_{max}$
  if $S(t_i, f_j) < x_k$:

$$\hat{F}_{obs}(f_j, x_k) = \hat{F}_{obs}(f_j, x_k) + \frac{1}{N_{obs}}.$$

End if
End for; End for; End for;

If a noise considered as Gaussian white noise over the whole width of a frequency slot of the TFR is taken as an example of noise, the distribution function of its spectrogram is equal to:

$$F(f, x) = 1 - \exp(-a(f)x)$$

with $a(f)=1/E[x]$, E being the mathematical expectation value.

The suitability test is then carried out for each frequency in order to determine whether the observations originate from the distribution function coming from the noise or not. This test consists in comparing the empirical distribution function with that coming from the noise. Various methods may be used, such as the $\chi^2$, Kolmogorov-Smirnov or Cramer-Von Mises tests. Other criteria, such as the mean or the root mean square of the differences between the two distribution functions may also be envisaged.

In the present example, the following method has been used for comparing the two distribution functions for each frequency, in other words for calculating the difference $C_f(f)$:

$$C_f(f) = \sum_x \frac{(F(f, x) - \hat{F}_{obs}(f, x))^2}{1 - F(f, x)}$$

If $C_f(f) \geq \alpha$, the observations do not correspond to the distribution function coming from the noise; this means therefore that the distribution is modified by the presence of a useful signal.

For the calculation of the threshold a, the following is used:

$$\alpha = \sum_x \frac{(F(f, x) - \hat{F}_{obs}(f, x))^2}{1 - F(f, x)}$$

$$= \sum_x \frac{(\exp(-ax) - \exp(-\hat{a}_{obs}x))^2}{\exp(-ax)}$$

$$\hat{a}_{obs} = \frac{1}{\hat{\mu}} = \frac{1}{\mu \pm k\sigma_x}$$

where $\mu = E[x]$, k a parameter predetermined according to an accepted number of false alarms, $\sigma_x$ represents the uncertainty in $\hat{\mu}$, $\sigma_x$ depends on the number of observations used for the estimation of $E[x]$ according to:

$$\sigma_x = \sqrt{\frac{D_{eq}}{D_{obs}}}$$

$D_{eq}$ is the equivalent duration, in other words the width of a rectangular window whose area is identical to that of the Gaussian window $h(t)$.

The time-frequency representation extends over a wide Doppler frequency band corresponding to the whole range of relative speed possible between an aircraft and the mass of air during a flight. This frequency band must cover a range of speed typically going from 0 to 300 m/s (for an airplane). However, at each moment in time, the speeds of the useful particles are distributed according to a Gaussian distribution, centered on the speed of the mass of air and whose width, corresponding to the speed dispersion between the particles resulting from the turbulence of the air, is of the order of 0.2 m/s. The frequencies of the useful signals coming from the particles are therefore contained within a frequency band much lower than that of the TFR. In contrast, the false alarms are distributed over the whole band of the TFR according to a distribution function depending on the nature of the noise. For a white noise, the behavior is uniform.

Reducing the frequency band analyzed allows the number of false alarms to be greatly reduced while at the same time conserving the useful signals. The detection threshold can thus be decreased in order to detect signals of lower amplitude, coming from smaller particles or those crossing the laser beam further from the focal point.

Figure 4A:
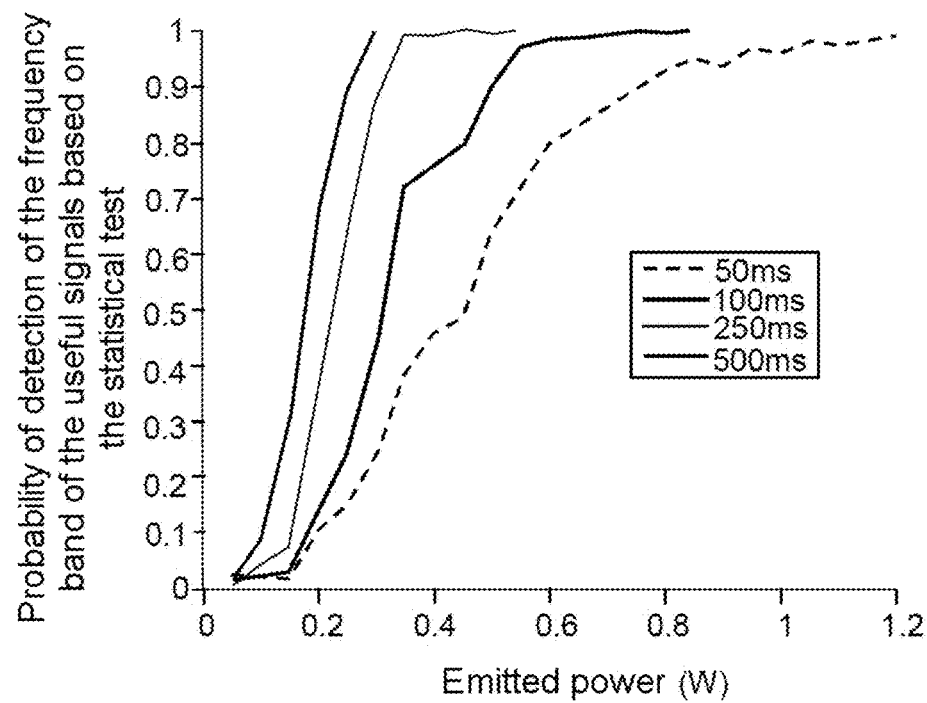
FIGS. 4a-c show the results obtained using a method such as described in the introduction and one example of a method according to the invention, with FIG. 4a illustrating probability of detection of the frequency band of useful signals versus emitted power, FIG. 4b illustrating detections versus false alarms, and FIG. 4c illustrating a number of particles detected versus emitted power.

This frequency band within which the useful signals are contained is therefore selected. These are the frequencies f such that $C_f(f) \geq \alpha$. The probability of detection of this frequency band of the useful signals, based on the statistical test, increases when the observation time increases, whereas the number of false alarms remains constant. In the present example, according to the results in FIG. 4a, an observation time in the range between 100 and 250 ms seems reasonable because the variations in the air speed vector are sufficiently small over this period to be able to consider that the Doppler frequency remains within the same frequency band. Beyond 250 ms, the gain provided by an increase in the observation time is small and all the more so since the Doppler frequency can vary quite significantly over this period. A frequency band is therefore selected whose width is of the order of 50 times smaller than that of the time-frequency representation.

When the frequency band has been selected, the useful signals within this band are detected, by selecting the points of the spectrogram $S(t,f)$ which are greater than a predetermined detection threshold as a function of the mean value of the spectrogram of the noise.

This detection threshold can be determined experimentally. It may also be determined as a function of various parameters: observation time $T_{obs}$, number of false alarms accepted, power emitted by the laser of the LiDAR, radius of the particles likely to pass through the laser beam.

If the observation time $T_{obs}$ increases, the empirical distribution function is evaluated based on a larger number of samples and the uncertainty decreases. Thus, the detection threshold, which is a function of the observation time, may be reduced while at the same time conserving a constant probability of false alarm. The average quantity of information originating from the useful signals does not increase but its variance decreases. For a longer observation time, the result of the method according to the invention is not modified at the frequencies containing useful signals. On the other hand, the variance of the noise decreases, which allows the detection threshold to be lowered and hence the probability of detection of the useful signal band to be increased.

This statistical approach with estimation of the range of Doppler frequency within which the useful signals must be sought advantageously allows the detection threshold to be decreased by several deciBels while at the same time conserving the desired rate of false alarms. It is for example considered that it is necessary to detect at least five useful signals in order to obtain a precise and robust estimate of the Doppler frequency. This number 5 is not an absolute minimum given that this depends on the dispersion of speed between the particles resulting from the atmospheric turbulence. Furthermore, the number of false alarms must be less than the number of useful signals. The number of false alarms detected during the period $T_{obs}$ is a Poisson process:

$$P(X=k) = \exp(-\Lambda)\frac{\Lambda^k}{k!}$$

with $\Lambda$ the mean number of false alarms detected during the period Tobs.

For a period Tobs=50 ms, $\Lambda$ is fixed in such a manner as to obtain $P(X \geq 5) \leq 0.01$. Hence, $\Lambda=1.28$.

Figure 4B:
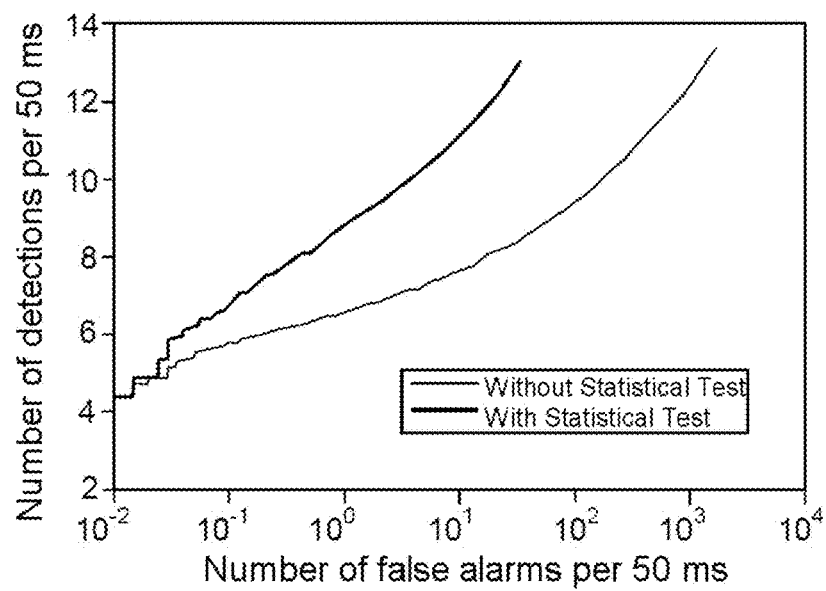

FIG. 4b shows the number of useful signals detected per period of 50 ms as a function of the number of false alarms per period of 50 ms according to the prior art (curve a) and according to the invention (curve b). It is observed that the method according to the invention, for the same probability of false alarm, allows the number of useful signals detected to be increased. Setting $\Lambda=1.28$ yields:

6.6 useful signals detected per 50 ms and a detection threshold of 12.9 dB according to the prior art such as described in the introduction, 9.0 useful signals detected per 50 ms and a detection threshold of 11.7 dB according to the invention.

The method according to the invention therefore allows the detection threshold to be decreased by 1.2 dB and, on average, 2.4 more useful signals per period of 50 ms to be detected in the case of the stratospheric background. In addition, the false alarms detected with the method according to the invention will have a limited impact on the estimation since their frequency is in the band of the useful signals and hence close to the desired frequency.

Figure 4C:
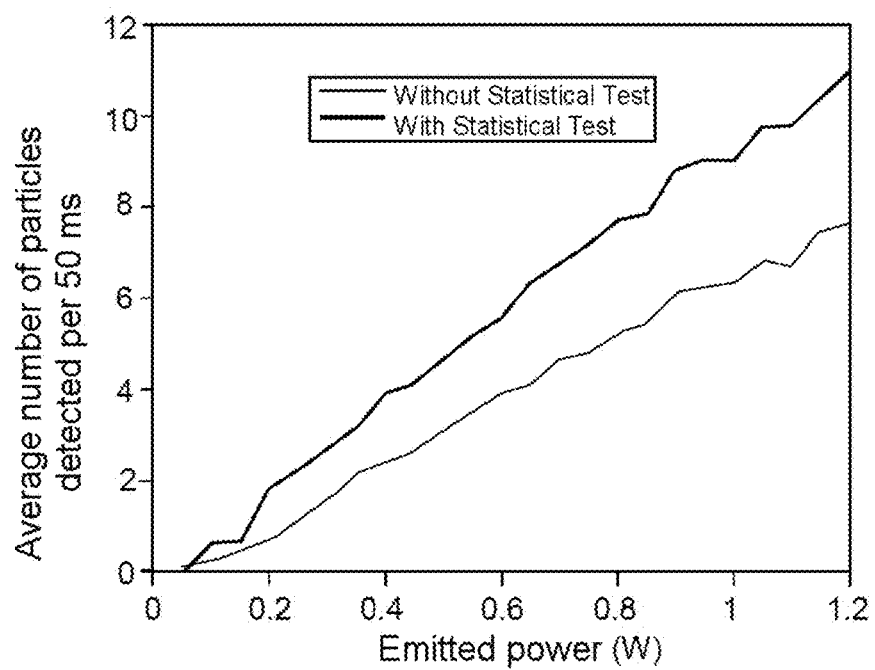

For a given laser power, the method according to the invention allows the mean number of particles detected to be increased with respect to the method described in the introduction. As shown in FIG. 4c, with a laser of 1 W, the mean number of particles detected over 50 ms is increased by close to 40%. Or for a given mean number of particles, the power of the laser can be reduced using the method according to the invention.

The amplitude of the signal backscattered by a particle is not a direct function of the radius of the particle but of the backscattering cross-section. For the particles whose radius is of the same order of magnitude as the wavelength of the laser, the backscattering cross-section is calculated based on the theory of Mie. It has been observed that, according to the method of the prior art, the minimum radius of a particle that can produce a detectable signal is around 0.18 μm. With the method according to the invention, the threshold is reduced by 1.2 dB and a signal produced by the passage of a particle with a radius greater than 0.165 μm can be detected, which is advantageous: the number of detectable particles increases by 30%.

If less than N signals have been selected, N being predetermined, then the radial speed is calculated in the following manner.

$$V_r = \frac{\lambda}{2} \frac{\sum_{f(C_f(f)>\alpha)} f \cdot C_f(f)}{\sum_{f(C_f(f)>\alpha)} C_f(f)}$$

or alternatively $$Vr = \frac{\lambda}{2} f(\max_{(C_f(f)>\alpha)} C_f(f)),$$

or, more generally, $Vr=f(\lambda, \alpha, f, C_f)$.

N is typically determined such that $\sigma_{V_r}$, the uncertainty in Vr, is less than an experimentally predetermined uncertainty. For example:

$$\sigma_{V_r} \leq 0.15 \text{ m/s}$$

This mode of calculation may potentially be performed directly after the calculation of the difference, without selecting a reduced frequency band. Then:

$$V_r = \frac{\lambda}{2} \frac{\sum_f f \cdot C_f(f)}{\sum_f C_f(f)}$$

or alternatively $$Vr = \frac{\lambda}{2} f(\max C_f(f)),$$

or, more generally, $Vr=f(\lambda, f, C_f)$.

Otherwise, at least N signals having been selected, the central frequency is estimated for each useful signal detected and the speed is estimated using these central frequencies.

$$V_r = \frac{\lambda}{2} \frac{\sum_{n=1}^{N_{sig}} f_0(n)}{N_{sig}}$$

$N_{sig}$: number of signals detected
$f_0$: central frequency of a signal.

Figure 5:
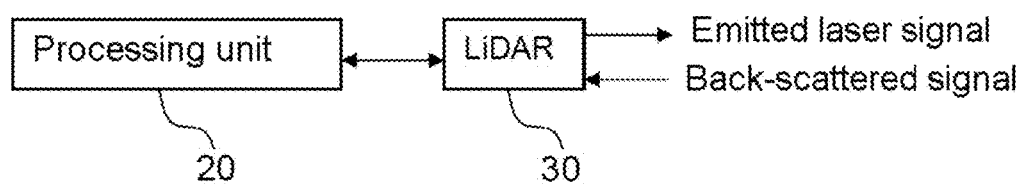
FIG. 5 shows schematically one example of a device for measuring the speed of an aircraft according to the invention.

This method for measuring the speed of an aircraft may notably be implemented using a computer program product, this computer program comprising code instructions allowing the steps of the reconstruction process to be carried out. It is stored on a readable medium by the processor unit 20 of a computer, connected to the LiDAR 30 of the aircraft as can be seen in FIG. 5, the computer preferably being installed onboard the aircraft but not necessarily. The medium may be electronic, magnetic, optical, electromagnetic or may be a broadcast medium of the infrared type. Such media are, for example, semiconductor memories (Random Access Memory RAM, Read-Only Memory ROM), tapes, diskettes or magnetic or optical disks (Compact Disc—Read Only Memory (CD-ROM), Compact Disc—Read/Write (CD-R/W) and DVD).

The claimed invention is:

1. A method for measuring the speed of an aircraft equipped with a lidar using coherent detection and with a unit for processing the detected signal, comprising:

the lidar emitting a laser beam, the lidar receiving a signal backscattered by particles present in the path of the emitted beam and the lidar generating a corresponding heterodyne signal, a processor unit processing the heterodyne signal by performing the following sub-steps:

the processor unit performing a time-frequency analysis of the heterodyne signal to thereby generate a time-frequency representation (TFR), a spectrogram, of the heterodyne signal generated by the lidar, said spectrogram being defined by the following relation:

$$S(t, f) = |TFCT(t, f)|^2$$

where TFCT is a short term Fourier Transform of the heterodyne signal u(t) defined by the following relation:

$$TFCT(t, f) = \int_{-\infty}^{+\infty} u(\tau)h(\tau - t)\exp(-2i\pi f\tau)d\tau$$

h(t) being a gaussian time-analysis window with a width $\sigma_h$ adapted to an expected length of an heterodyne signal resulting from a particle passing through the lidar beam, h(t) being defined by the following relation:

$$h(t) = \frac{1}{\sqrt{2\pi} \cdot \sigma_h} \exp\left(-\frac{t^2}{\sigma_h^2}\right)$$

the processor unit generating an estimation of the value of a distribution function $F_{obs}(f,x)$ of the amplitude of the spectrogram of the heterodyne signal, said estimation being done on frequencies $f_j$ belonging to a given frequency range $[0, F_e/2]$ corresponding to a given range of speed of the aircraft, and on amplitudes $x_k$ belonging to a given range $[0, x_{max}]$, where $x_{max}$ is a predetermined value corresponding to the value from which the distribution function of the noise is substantially equal to 1; said estimation being done for instants $t_i$ belonging to a time range $[0, T_{obs}]$ where $T_{obs}$ is defined such that the speed of the aircraft remains stable over said time range;

the processor unit generating, on the same given frequency and amplitude ranges, an estimation of a distribution function of the TFR of a measurement noise associated with the heterodyne signal, said estimation F(f,x) being considered as a reference the processor unit determining the difference between the distribution function $F_{obs}(f,x)$ of the TFR of the heterodyne signal and the reference distribution function of the TFR of the measurement noise associated with the heterodyne signal, said difference being defined by the following relation:

$$C_f(f) = \sum_x \frac{(F(f, x) - \hat{F}_{obs}(f, x))^2}{1 - F(f, x)}$$

the processor unit generating an estimation of the value of the radial speed $V_r$ of the aircraft according to the direction of the measurement being, said estimation being determined using $C_f(f)$;

the value of the radial speed $V_r$ being used to determine and provide the airspeed vector components of the aircraft.

2. The method of claim 1 wherein the processor unit generates the TFR by time-scale transformation of the heterodyne signal.

3. The method of claim 1, wherein the measurement noise is considered stationary over a time for estimation of the reference distribution function, associated with the range of speeds of the aircraft.

4. The method of claim 1, wherein the laser beam is generated by an infrared (IR) laser.

5. The method of claim 1, wherein the measurement noise associated with the heterodyne signal being considered as Gaussian white noise, said estimation F(f, x) of the reference distribution function is given by the following relation:

$$F(f, x) = 1 - \exp(-a(f)x)$$

where $a(f) = 1/E[x]$, E being the mathematical expected value.

6. The method of claim 1, wherein the processor unit generates an estimation of the value of the radial speed $V_r$ of the aircraft according to the direction of the measurement by implementing the following sub-steps:

the processor unit determines a reduced frequency band for which $C_f(f)$ is greater than or equal to a threshold a determined from the number of allowed false alarms;

the processor unit determines the number $N_{sig}$ of useful signals within this band by selecting the points of the spectrogram S(t,f) which are greater than a predetermined detection threshold number such that:

when the number of useful signals is greater than said threshold number the processor unit computes $V_r$ using the following relation:

$$V_r = \frac{\lambda}{2} \frac{\sum_{n=1}^{N_{sig}} f_0(n)}{N_{sig}}$$

where $f_0(n)$ is the center frequency of the considered useful signal;

when the number of useful signals is less than said threshold number the processor unit computes $V_r$ using the following relation:

$$V_r = \frac{\lambda}{2} \frac{\sum_{f(C_f(f) > a)} f \cdot C_f(f)}{\sum_{f(C_f(f) > a)} C_f(f)};$$

said predetermined detection threshold number being a function of the mean value of the spectrogram of the noise.

7. A computer readable medium comprising code instructions that, if executed on a computer, cause a computer processor unit to measure the speed of an aircraft equipped with a lidar using coherent detection and with the processor unit processing the detected signal by:

the processor unit causing the lidar to emit a laser beam, the lidar receiving a signal backscattered by particles present in the path of the emitted beam and the lidar generating a corresponding heterodyne signal, the processor unit processing the heterodyne signal by performing the following sub-steps:

the processor unit performing a time-frequency analysis of the heterodyne signal to thereby generate a time-frequency representation (TFR), a spectrogram, of the heterodyne signal generated by the lidar, said spectrogram being defined by the following relation:

$S(t, f) = |TFCT(t, f)|^2$ where TFCT is a short term Fourier Transform of he heterodyne signal u(t) defined by the following relation:

$TFCT(t,f) = \int_{-\infty}^{+\infty} u(\tau)h(\tau-t)\exp(-2i\pi f\tau)d\tau$ h(t) being a gaussian time-analysis window with a width $\sigma_h$ adapted to an expected length of an heterodyne signal resulting from a particle passing through the lidar beam, h(t) being defined by the following relation:

$h(t) = \frac{1}{\sqrt{2\pi} \cdot \sigma_h} \exp\left(-\frac{t^2}{\sigma_h^2}\right)$ the processor unit generating an estimation of the value of a distribution function $F_{obs}(f,x)$ of the amplitude of the spectrogram of the heterodyne signal said estimation being done on frequencies $f_j$ belonging to a given frequency range $[0, F_e/2]$ corresponding to a given range of speed of the aircraft, and on amplitudes $x_k$ belonging to a given range $[0, x_{max}]$, where $x_{max}$ is a predetermined value corresponding to the value from which the distribution function of the noise is substantially equal to 1; said estimation being done for instants $t_i$ belonging to a time range $[0, T_{obs}]$ where $T_{obs}$ is defined such that the speed of the aircraft remains stable over said time range;

the processor unit generating, on the same given frequency and amplitude ranges, an estimation of a distribution function of the TFR of a measurement noise associated with the heterodyne signal, said estimation F(f,x) being considered as a reference the processor unit determining the-difference between the distribution function $F_{obs}(f,x)$ of the TFR of the heterodyne signal and the reference distribution function of the TFR of the measurement noise associated with the heterodyne signal, said difference being defined by the following relation:

$C_f(f) = \sum_x \frac{(F(f,x) - \hat{F}_{obs}(f,))^2}{1 - F(f,x)}$ the processor unit generating an estimation of the value of the radial speed $V_r$ of the aircraft according to the direction of the measurement being, said estimation being determined using $C_f(f)$; and the processor unit using the value of the radial speed $V_r$ to determine and provide the airspeed vector components of the aircraft.

8. A system for measuring the speed of an aircraft, comprising:
a lidar using coherent detection; and
a processor unit for processing the detected signal by:
the processor unit causing the lidar to emit a laser beam;

the processor unit receiving a signal backscattered by particles present in the path of the emitted laser beam and the lidar generating a corresponding heterodyne signal;

the processor unit processing the heterodyne signal by performing the following sub-steps:

the processor unit performing a time-frequency analysis of the heterodyne signal to thereby generate a time-frequency representation (TFR), a spectrogram, of the heterodyne signal generated by the lidar, said spectrogram being defined by the following relation:

$S(t, f) = |TFCT(t, f)|^2$ where TFCT is a short term Fourier Transform of the heterodyne signal u(t) defined by the following relation:

$TFCT(t, f) = \int_{-\infty}^{+\infty} u(\tau)h(\tau - t)\exp(-2i\pi f\tau)d\tau$ h(t) being a gaussian time-analysis window with a width $\sigma_h$ adapted to an expected length of an heterodyne signal resulting from a particle passing through the lidar beam, h(t) being defined by the following relation:

$h(t) = \frac{1}{\sqrt{2\pi} \cdot \sigma_h} \exp\left(-\frac{t^2}{\sigma_h^2}\right)$ the processor unit generating an estimation of the value of a distribution function $F_{obs}(f,x)$ of the amplitude of the spectrogram of the heterodyne signal, said estimation being done on frequencies $f_j$ belonging to a given frequency range $[0, F_e/2]$ corresponding to a given range of speed of the aircraft, and on amplitudes $x_k$ belonging to a given range $[0, x_{max}]$, where $x_{max}$ is a predetermined value corresponding to the value from which the distribution function of the noise is substantially equal to 1; said estimation being done for instants $t_i$ belonging to a time range $[0, T_{obs}]$ where $T_{obs}$ is defined such that the speed of the aircraft remains stable over said time range;

the processor unit generating, on the same given frequency and amplitude ranges, an estimation of a distribution function of the TFR of a measurement noise associated with the heterodyne signal, said estimation F(f,x) being considered as a reference the processor unit determining the-difference between the distribution function $F_{obs}(f,x)$ of the TFR of the heterodyne signal and the reference distribution function of the TFR of the measurement noise associated with the heterodyne signal, said difference being defined by the following relation:

$C_f(f) = \sum_x \frac{(F(f,x) - \hat{F}_{obs}(f,))^2}{1 - F(f,x)}$ the processor unit generating an estimation of the value of the radial speed $V_r$ of the aircraft according to the direction of the measurement being, said estimation being determined using $C_f(f)$; and the processor unit being further configured to use the value of the radial speed $V_r$ to determine and provide the airspeed vector components of the aircraft.

* * * * *